United States Patent
Häßler et al.

(10) Patent No.: US 11,913,514 B2
(45) Date of Patent: Feb. 27, 2024

(54) TORSIONAL VIBRATION DAMPER WITH A ROTATIONAL AXIS FOR A POWERTRAIN

(71) Applicant: Schaeffler Technologies AG & Co. KG, Herzogenaurach (DE)

(72) Inventors: Martin Häßler, Graben-Neudorf (DE); Alain Rusch, Gambsheim (FR); Laurent Theriot, Strasbourg (FR); Michael Kessler, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 278 days.

(21) Appl. No.: 17/425,736

(22) PCT Filed: Jan. 29, 2020

(86) PCT No.: PCT/DE2020/100057
§ 371 (c)(1),
(2) Date: Jul. 26, 2021

(87) PCT Pub. No.: WO2020/173521
PCT Pub. Date: Sep. 3, 2020

(65) Prior Publication Data
US 2022/0163090 A1 May 26, 2022

(30) Foreign Application Priority Data

Feb. 27, 2019 (DE) .................. 10 2019 105 010.3
Aug. 6, 2019 (DE) .................. 10 2019 121 204.9

(51) Int. Cl.
*F16F 15/12* (2006.01)
*F16F 15/121* (2006.01)

(52) U.S. Cl.
CPC ...... *F16F 15/1205* (2013.01); *F16F 15/1216* (2013.01)

(58) Field of Classification Search
CPC ........ F16F 15/10; F16F 15/12; F16F 15/1202; F16F 15/1204; F16F 15/1205;
(Continued)

(56) References Cited

U.S. PATENT DOCUMENTS 11,015,677 B2 * 5/2021 Häßler ............... F16F 15/1435
11,454,287 B2 * 9/2022 Ahnert ............... F16F 15/1204
(Continued)

FOREIGN PATENT DOCUMENTS

CN 1818415 B 2/2012
CN 105452712 A 3/2016
(Continued)

*Primary Examiner* — Adam D Rogers

(57) ABSTRACT

A torsional vibration damper includes an input side for receiving a torque, an output side for dispensing the torque, an intermediate element arranged for torque transmission between the input side and the output side, an energy storage element supporting the intermediate element such that it can vibrate relative to the input side and the output side, and a roll body. The intermediate element has a transmission path for the roll body. The input side or the output side forms a path side with a counter path that is complementary to the transmission path, and the other of the input side or the output side forms a force side. The roll body is guided in a rotatable manner between the transmission path and the counter path, and the energy storage element connects the force side to the intermediate element for torque transmission.

7 Claims, 4 Drawing Sheets

(58) Field of Classification Search
CPC ............... F16F 15/1213; F16F 15/1216; F16F 15/1217; F16F 15/1421; F16F 15/30; F16F 2232/02
See application file for complete search history.

(56) References Cited

U.S. PATENT DOCUMENTS

| | | | |
|---|---|---|---|
| 2015/0053527 A1 | 2/2015 | Oda | |
| 2015/0285332 A1 | 10/2015 | Kram et al. | |
| 2022/0145960 A1* | 5/2022 | Häßler | ............... F16F 15/1213 |

FOREIGN PATENT DOCUMENTS

| | | | | |
|---|---|---|---|---|
| CN | 205078698 U | | 3/2016 | |
| CN | 106958621 A | | 7/2017 | |
| DE | 19549459 C2 | | 3/2000 | |
| DE | 102015211899 A1 | | 12/2016 | |
| DE | 102018108441 A1 | | 10/2019 | |
| DE | 102019115750 A1 | * | 12/2020 | |
| DE | 102019115752 A1 | | 12/2020 | |
| DE | 102019115753 A1 | * | 12/2020 | |
| DE | 102019115754 A1 | * | 12/2020 | |
| DE | 102019115755 A1 | * | 12/2020 | |
| DE | 102019115756 A1 | * | 12/2020 | |
| DE | 102019115757 A1 | * | 12/2020 | |
| DE | 102019115758 A1 | * | 12/2020 | |
| DE | 102019124493 A1 | * | 3/2021 | |
| DE | 202021100070 U1 | * | 3/2021 | .......... F16F 15/1204 |
| DE | 102020105252 A1 | * | 9/2021 | |
| DE | 102021124323 B3 | * | 11/2022 | |
| EP | 2508771 A1 | | 10/2012 | |
| EP | 3057321 A1 | | 4/2018 | |
| FR | 3057321 A1 | | 4/2018 | |
| FR | 3057323 A1 | | 4/2018 | |
| JP | S57173620 A | | 10/1982 | |
| JP | S58113636 A | | 7/1983 | |
| JP | S62220737 A | | 9/1987 | |
| JP | H04113028 A | | 4/1992 | |
| KR | 20150081429 A | | 7/2015 | |
| WO | 2011147632 A2 | | 12/2011 | |
| WO | 2018010722 A1 | | 1/2018 | |
| WO | 2018215018 A1 | | 11/2018 | |
| WO | WO-2018215018 A1 | * | 11/2018 | .......... F16F 15/1204 |

* cited by examiner

TORSIONAL VIBRATION DAMPER WITH A ROTATIONAL AXIS FOR A POWERTRAIN

CROSS-REFERENCE TO RELATED APPLICATIONS

This application is the United States National Phase of PCT Appln. No. PCT/DE2020/100057 filed Jan. 29, 2020, which claims priority to German Application Nos. DE102019105010.3 filed Feb. 27, 2019 and DE102019121204.9 filed Aug. 6, 2019, the entire disclosures of which are incorporated by reference herein.

TECHNICAL FIELD

The disclosure relates to a torsional vibration damper having a rotational axis for a powertrain.

BACKGROUND

Such torsional vibration dampers of a variety of different types are known from the prior art. For example, from EP 2 508 771 A1 is known a torsional vibration damper in which an output side is provided with a (double) cam which acts on a lever-like intermediate element, the intermediate element being tiltably connected to a disk on an input side. The intermediate element is pretensioned against the cam on the output side by means of a compression spring and is deflected against the compression spring when the cam geometry is overrun. The compression spring is connected to the input side opposite the intermediate element so as to transmit a pressure force, and thus a torque is directed via the compression spring from the input side to the output side.

Another variant of a torsional vibration damper is known from FR 3 057 321 A1, in which a lever-like spring body in the form of a (free-form) solid body spring is provided on an output side, wherein this spring body has a ramp-like transmission path radially on the outside, which is connected so as to transmit a torque to a roller rolling on this transmission path. The roller is rotatably mounted on a bolt. If a torsional vibration occurs, a relative movement is brought about between the spring element and the corresponding roller, and due to the ramp-like transmission path, the spring body is deflected in the rotational relative movement thereof to the roller by the roller against the spring force thereof in a lever-like manner. This dampens a torsional vibration.

Both the levers from EP 2 508 771 A1 and the spring bodies from FR 3 057 323 A1 are technically difficult to control and/or expensive to manufacture or assemble if low dissipation, i.e., high efficiency is desired.

For example, from WO 2018/215 018 A1, is known a torsional vibration damper in which two intermediate elements are provided, which are mounted between an output side and an input side via roll bodies. The roll bodies run on complementary transmission paths in such a way that the intermediate elements are subject to a constraining guide. The two intermediate elements are pretensioned against each other by means of energy storage elements, so that the functionally-active rigidity of the energy storage elements can be designed independently of a torque transmission.

For many applications, it is necessary on the one hand to reduce the natural frequency of a torque-transmitting system and at the same time to be able to transmit a high torque. It follows from the first requirement that the functional rigidity must be low. It follows from the second requirement that the rigidity of the energy storage elements must be high. These conflicting requirements can be solved by means of the roll bodies and the transmission paths.

A torque is only transmitted between the input side and the output side by means of the transmission paths and the roll bodies arranged therebetween. The functionally-active rigidity, which changes the natural frequency, is translated into a small spring deflection due to the low gradient and the large angle of rotation. This cam mechanism results in an (arbitrarily) low, functionally-active rigidity. This system has the advantage that the energy storage elements can be designed independently of the (maximum) transmittable torque. However, having a large number of separate roll bodies and the high demands placed on the complementary transmission paths, the embodiment shown is complex and expensive to manufacture and assemble. This means that this system is not competitive in all areas.

SUMMARY

The disclosure relates to a torsional vibration damper having a rotational axis for a powertrain, having at least the following components: an input side for receiving a torque; an output side for dispensing a torque; at least one intermediate element connected so as to transmit a torque between the input side and the output side; at least one energy storage element, by means of which the intermediate element is supported so as to be able to vibrate relative to the input side and relative to the output side; and at least one roll body. The intermediate element has a transmission path belonging to the roll body, and the input side or the output side forms a path side and respectively the other side forms a force side. The path side has a counter path complementary to the transmission path, and the roll body is guided in a rotatable manner between the transmission path and the counter path for torque transmission.

The force side may be connected to the intermediate element so as to transmit a torque by means of the energy storage element.

In the following, if the axial direction, radial direction or the circumferential direction and corresponding terms are used without explicitly indicating otherwise, reference is made to the mentioned rotational axis. Unless explicitly stated otherwise, ordinal numbers used in the previous and subsequent descriptions are used only for the purposes of clear distinction and do not indicate the order or ranking of the designated components. An ordinal number greater than one does not necessarily mean that another such component must be present.

In one embodiment, the input side, for example in a main state, for example a traction torque transmission, forms the torque input side, the path side and the output side forms the force side. In an alternative embodiment, the output side, for example in a secondary state, for example a thrust torque transmission, forms the torque input side, the path side and the input side forms the force side.

The torsional vibration damper proposed here possesses a small number of separate components and only a small number of roll bodies and complementary transmission paths, which are referred to here as the transmission path between the elements and as the (complementary) counter path on the input or output side. The input side is set up here to receive a torque, whereby it is not excluded here that the input side is also set up to dispense a torque. For example, the input side forms the torque input in a main state, for example in a powertrain of a motor vehicle with what is termed a traction torque, i.e., a torque output from a drive engine, for example an internal combustion engine and/or an electric machine, via a gear train to vehicle wheels for propulsion of the motor vehicle. The output side is set up accordingly to dispense a torque, and the output side may also be set up to receive a torque. The output side thus forms, for example, in the application in a powertrain of a motor vehicle in a secondary state, the input side for what is termed a thrust torque, i.e., when the inertial energy of the moving motor vehicle during engine braking or during recuperation (recovery of electrical energy from the deceleration of the motor vehicle) forms the input torque.

To avoid transmitting a torsional vibration directly from the input side to the output side or vice-versa, at least one intermediate element is provided, e.g., at least two intermediate elements. The at least one intermediate element is arranged to be connected so as to transmit a torque between the input side and the output side. Here, the at least one intermediate element can be moved relative to the input side and relative to the output side, so that a torsional vibration can be induced in the intermediate element and thus on the energy storage elements with a predetermined (functionally effective) rigidity. The natural frequency, a function of the mass and the rigidity, of the system in which the torsional vibration damper is integrated can thus be changed, e.g., reduced.

The intermediate element is supported relative to the force side by means of at least one energy storage element, for example an arc spring, a leaf spring, a gas pressure accumulator or the like. The force side is formed from the input side or from the output side in that a corresponding, e.g., one-piece, connecting device is formed for the at least one energy storage element, for example a contact surface and/or a rivet point.

On the path side, the at least one intermediate element is supported by means of at least one roll body, the intermediate element having a transmission path for each of the roll bodies and a complementary counter path for the same roll body being formed on the path side. The path side is formed from the output side or from the input side in that the counter path, which may be formed in one piece with the path side, is formed for the at least one roll body. A torque is transmitted via the counter path and transmission path. A torque is also transmitted via the energy storage element between the force side and the intermediate element.

If, for example, a torque is introduced, for example from the path side, the roll bodies on the transmission path and the complementary counter path are rolled (up) from a rest position in the corresponding direction on the ramp-like transmission path as a result of a torque gradient above the torsional vibration damper. A rolling up is used here merely for illustration to designate the fact that work is being done. More precisely, because of the geometric relationship, an opposing force of the energy storage element is overcome. Rolling down means dispensing stored energy from the energy storage element in the form of a force on the assigned intermediate element. Up and down do not necessarily correspond to one spatial direction, not even in a co-rotating coordinate system.

With this torque-related movement, the roll bodies force the assigned intermediate element to move relative to the path side and the force side, and the energy storage element, which acts antagonistically, is tensioned accordingly. If there is a change in the applied torque and, as a result, a speed difference between the path side and the force side, such as in the case of torsional vibration, this is counteracted by the inertia of the force side (here) of the output side, and the roll bodies roll back and forth (in a predetermined manner) on the transmission path as well as on the complementary counter path around the position corresponding to the applied torque. The roll bodies thus counteract the energy storage element, which is tensioned as a function of a torque amount, so that a natural frequency is changed compared to a rest position or torque transmission without a torsional vibration damper (but with the same flywheel mass that is moved along).

The force is absorbed by the correspondingly designed energy storage element in the form of compression, expansion, torsion or other energy storage, and is passed on with a time delay, e.g., (almost) dissipation-free, to the force side. The torque input (here, for example) of the path side, including the torsional vibration, is thus passed along changed over time (here, for example) to the force side, e.g., (almost) without loss. In addition, as explained above, the natural frequency is not constant, but rather depends on the torque gradient and thus on the applied torque as a result of the changeable position of the intermediate element.

In the opposite case, when a torque is introduced via the force side, for example the output side, the at least one energy storage element is loaded in the other direction and a corresponding force is thus introduced onto the intermediate element. The roll body is accordingly rolled in the other direction (opposite to the above description of the introduction of a torque via the path side) on the transmission path (up). This movement of the roll body only follows a load on the energy storage element here. When the torque changes, as occurs with torsional vibration, the at least one energy storage element is deflected around the position corresponding to the applied torque and the stored energy in the form of a changed, i.e., time-delayed movement, in interaction with the rolling roll bodies between the respective transmission path and complementary counter path (here) on the path side. This changes the natural frequency of the torque-transmitting system into which the torsional vibration damper is integrated.

In the case of a reverse construction, the force side is formed from the input side and the path side from the output side. The function is then identical to the description above, with the input side being replaced by the output side and the output side by the input side in the above description.

In one embodiment, two or more intermediate elements are provided, which may be arranged to be rotationally symmetrical to the rotational axis, so that the torsional vibration damper is balanced with simple means. For a small number of components and (transmission) paths, an embodiment with exactly two intermediate elements is advantageous.

Two energy storage elements may be provided to act on a (single) intermediate element, the energy storage elements being arranged antagonistically to each other and may be balanced with each other in accordance with the embodiment of the transmission paths and complementary counter paths. In an alternative embodiment, at least one constraining guide is provided, by means of which a movement is imposed geometrically guided at least on one of the intermediate elements, for example in the manner of a rail or groove and an encompassing pin or spring engaging therein. This means that the movement of the respective intermediate element is (geometrically) over-defined.

It is further proposed in an example embodiment of the torsional vibration damper that the at least one intermediate element is mounted solely by means of the at least one assigned energy storage element and by means of the assigned roll bodies.

In this embodiment, the at least one intermediate element has no further support than via the at least one roll body and via the at least one energy storage element. This means that there are no (additional) friction effects. The at least one intermediate element is guided in the axial direction by means of the at least one energy storage element, the at least one roll body, a contact surface on the force side and/or the path side. The at least one intermediate element may be held axially in a purely frictional manner via the at least one roll body and/or the at least one energy storage element and is only secured by an axial stop against loss in the event of a load that is not according to design with an axial force component.

It is also proposed in an example embodiment of the torsional vibration damper that the at least one intermediate element is connected by means of two antagonistic energy storage elements to the force side so as to transmit a torque.

In this embodiment, a pretensioning of the energy storage elements can be adjusted against at least one roll body in a well-manageable and reliable manner via the intermediate element and/or a pretensioning of the intermediate element. For example, with structurally identical energy storage elements, the dependency on component tolerances, for example the spring characteristic of an energy storage element, is low in that the tolerances mutually decrease, for example a rigidity deviating downwards from the target rigidity of the first energy storage element is compensated for or reduced by the upwardly deviating rigidity of the second energy storage element. With the same direction of deviation, the pretensioning is indeed reduced or increased overall compared to the target pretensioning, but is nevertheless balanced as a result of the antagonistic effect, for example on both sides of the intermediate element.

In one embodiment, only the rest position of the intermediate element is changed. The tolerance may be so small that the rest position remains within a predetermined tolerance range. In an embodiment with two intermediate elements, the (four) energy storage elements are connected to each other in such a way that the first (or second) energy storage element of the first intermediate element is also in antagonistic operative connection with the second (or first) energy storage element of the second intermediate element (by means of the power side) and a compensating effect on the component tolerance of the energy storage elements is achieved. Overall, the required manufacturing accuracy, the assembly effort, or the adjustment effort and/or the cost expenditure for standard components are reduced due to a lower component quality.

It is also proposed in an example embodiment of the torsional vibration damper that the first energy storage element exerts a first force and a first direction of force on the assigned intermediate element and the second energy storage element exerts a second force and a second direction of force on the assigned intermediate element. The first force and the second force differ from each other and/or the first direction of force and the second direction of force differ from each other in a rest position.

It should be pointed out that the energy storage elements do not tilt about a radial axis or that such tilting is not conducive to influencing the natural frequency. The direction of force described here is thus defined as a vector which lies in the plane of rotation to which the rotational axis is oriented normally. Furthermore, it should be noted that the direction of force of the two antagonistic energy stores is always not the same, as long as they are considered in a global, i.e., common, coordinate system. Here, the direction of force is meant in comparison to the mirroring of the other direction of force, namely the mirroring on a rest axis or center line (in the rest position) of the intermediate element and possibly the force side, which then deviates from the other direction of force.

The force here refers only to the magnitude of a force vector. The force vector can therefore be broken down into the force (magnitude) and the direction of the force (effective direction).

It should also be pointed out that the forces and directions of force of the two antagonistic energy storage elements differ from each other in a symmetrical design in a deflected state of the intermediate element and in a non-symmetrical design, as proposed here, can be the same in a deflected state.

In this embodiment, a different torque characteristic curve is set up for a traction torque transmission and a thrust torque transmission in the opposite direction, so that the influencing of the natural frequency by means of the torsional vibration damper is different depending on the direction of the torque. In this case, the intermediate element may be brought into equilibrium, as described above, by means of a corresponding transmission path.

In one embodiment, the two antagonistic energy storage elements used are the same (in the non-installed, i.e., relaxed state). Here, the different force is set up, for example, by means of the form of the traction torque pairing and the thrust torque pairing of the transmission path deviating from each other (compare the description above). In another variant, the different force is established by means of an installation distance of different length between the force side and the intermediate element.

The different direction of force is achieved, for example, by a different inclination of the contact surfaces on the intermediate element and/or on the force side for the two antagonistic energy storage elements. In one embodiment, the direction of force is variable via a deflection of the intermediate element, in that at least one of the two antagonistic energy storage elements tilts about an axis parallel to the rotational axis. As a result of a different direction of force, with otherwise identical energy storage elements, the spring deflection, that is to say the energy absorption with (the same) deflection of the intermediate element, is different. In this installation situation, the rigidity of identical, antagonistic energy storage elements is therefore different. Benefits in terms of costs and assembly effort or assembly reliability can be realized by using the same energy storage elements. In the above context, however, identical energy storage elements are only mentioned to clarify the relationship and the use of different directions of force is not restricted to such a case.

It is also proposed in an example embodiment of the torsional vibration damper that the at least one intermediate element is supported on the path side by means of two roll bodies.

In this embodiment, a form of movement is imposed on the intermediate element as a result of a double guidance through two roll bodies and two mutually synchronized transmission paths with complementary counter paths. Such an embodiment can be set up in such a way that the at least one energy storage element only has a pretensioning function against the roll bodies with regard to the stability of the position of the intermediate element, for example by means of a radial force component of the force on the associated intermediate element. In addition, even in an embodiment without additional (constrained) guide elements, it is not necessary to set a moment equilibrium with the forces introduced on the intermediate element. Only the resulting radial contact force must be sufficiently large to ensure a torque transmission by means of the transmission path, that is to say the traction torque pairing or the thrust torque pairing, when the torque is applied. In an example embodiment, such a moment equilibrium is approximated so that dissipation effects as a result of forced relative movement between the at least one energy storage element and the associated intermediate element are reduced or even avoided.

It is also proposed in an example embodiment of the torsional vibration damper that the at least one intermediate element is supported by means of one single roll body on the path side.

This embodiment benefits from a small number of components and thus low parts costs and assembly costs. In an alternative embodiment, at least one constraining guide is provided, by means of which a movement is imposed geometrically guided at least on one of the intermediate elements, for example in the manner of a rail or groove and an encompassing pin or spring engaging therein.

In an example embodiment, in a (constraining guide-free) embodiment without additional (constraining) guide elements for constrained guidance, the introduced force direction of the force, i.e., the alignment of the force vector along or parallel to an action line, of the at least one energy storage element, e.g., of the two energy storage elements, regardless of the deflection of the intermediate element in the moment balance point of the intermediate element with that action line of the resulting (counter) force, intersects the roll body which runs through the rolling center (rolling axis) of the roll body and is aligned perpendicular to the transmission path and to the complementary counter path. Thus, there is a moment equilibrium at the intermediate element around the moment balance point of the intermediate element. It follows intrinsically therefrom that the force component of the force vectors conducted via the roll bodies corresponds to the forces or the force components of the energy storage elements acting on the intermediate element. This means that if the force of the energy storage elements is increased, the resulting force via the roll bodies also increases with this design rule. The force vectors in the case of two antagonistic energy storage elements thus form a force triangle.

It is further proposed in an example embodiment of the torsional vibration damper that the transmission paths and the respective complementary counter paths each include a traction torque pairing with a first transmission curve and a thrust torque pairing with a second transmission curve. The traction torque pairing is set up for torque transmission from the input side to the output side, the thrust torque pairing is set up for torque transmission from the output side to the input side, and the first transmission curve and the second transmission curve have different transmission pathways from each other, at least in certain areas.

In general, a traction torque and a thrust torque do not differ in a theoretical application. The terms are therefore to be seen neutrally and only serve to make it easy to distinguish the designated torque transmission direction. These terms are taken from the usual designations in a powertrain of a motor vehicle, but can be transferred accordingly for other applications. The traction torque pairing is applied in a traction torque transmission, for example from the input side to the output side, with the roll body rolling (up) on the traction torque pairing against the force of the antagonistic energy storage element with increasing torque. In this way, the potential of this antagonistic energy storage element is increased, for example tensioned, and thus the rigidity is changed. Torsional vibrations therefore counteract a greater force of the antagonistic energy storage element as the torque increases, and the natural frequency is thus changed. This applies accordingly to the thrust torque pairing, the roll body being forced to roll (up) on the thrust torque pairing as a result of the load on the energy storage element.

In this embodiment, the first transmission curve and the second transmission curve, which each start from a common point of the rest position, are provided with different transmission pathways. The rigidity properties of the torsional vibration damper can therefore be individually set up (differently) for a traction torque and a thrust torque.

In one embodiment, for example, a large damping moment is required for the transmission of a traction torque, which can be achieved over a larger angle of rotation (a lower reduction ratio, i.e., a smaller denominator of the transmission ratio) than is desired for a thrust torque (a larger reduction ratio). Furthermore, for example, a progressive or degressive vibration damping is desired, or even a multiple-variable vibration damping is desired. For example, there is a slight increase in damping moment for the region close to idling, for a main load torque there is a steep increase in damping moment, which again decreases increasingly degressively, and a progressive increase in damping moment is again established up to a maximum transfer of a transmittable torque.

Here, the transmission path and the complementary counter path are to be designed in accordance with the respective deflection position of the intermediate element, so that the transmission curve is to be executed when superimposed with the movement of the intermediate element. The transmission path and the complementary counter path may be designed for a moment equilibrium in accordance with the above description, e.g., so that no additional (constrained) guide device is necessary for the intermediate element.

It is also proposed in an example embodiment of the torsional vibration damper that the at least one energy storage element is a helical compression spring with a straight spring axis.

A helical compression spring with a straight spring axis, also referred to as a (purely) cylindrical helical compression spring, is a widely used standard component, the elastic and (low) dissipative properties of which are well known and easily controllable. Tolerances in the overall length or the spring characteristic versus a predetermined installation length can be compensated for by simple means. In addition, such helical compression springs do not require any additional guidance, which would otherwise cause friction and thus have a reduced efficiency and/or a damping property that is more difficult to determine due to hysteresis effects. In addition, a helical compression spring enables a large variance in the spring characteristic, Which can be adjusted, among other things, through the pitch of the windings, wire thickness, the ratio of the installation length to the relaxed length, and the choice of material.

In addition, helical compression springs with a straight spring axis are unbreakable compared to other types of springs, for example steel springs, and in some embodiments can be loaded to the block so that in the event of an overload on the torsional vibration damper in such an embodiment of the energy storage element that can be brought to block, no additional securing element need be provided against breaking of the energy storage element. In addition, a helical compression spring has a long possible spring deflection with simultaneous high spring rigidity, so that on the one hand a large torque can be conducted via the at least one energy storage element and on the other, a suitable reduction in movement can be set up with the aid of the transmission path, so that a reduced amplitude of the torsional vibration compared to the amplitude of the movement of the intermediate element is achieved, and thus the torsional vibrations result in a small spring deflection of the helical compression spring. As a result, the helical compression spring counteracts the torsional vibration with a (suitably) low force despite the high rigidity thereof.

It is also proposed in an embodiment of the torsional vibration damper that the at least one energy storage element, e.g., designed as a helical compression spring with a straight spring axis, is mounted on the intermediate element and/or on the force side in a displaceable manner transversely to the spring axis.

As a result of such a displaceability, a small opposing moment (around the moment balance point of the intermediate element) is exerted, despite a radial movement component of the movement of the intermediate element and/or a non-tangential alignment of the spring axis at the point of application on the intermediate element or respectively on the contact surface on the force side. The displaceability is established by means of a suitable surface property with a low opposing friction force or by means of a separate pair of bearings. A guide is provided to prevent the energy storage element from tilting or the relative movement is so small that, despite (low) frictional forces, a tilting moment is never large enough to deflect the energy storage element accordingly.

BRIEF DESCRIPTION OF THE DRAWINGS

The above disclosure is explained in detail below based on the relevant technical background with reference to the associated drawings, which show example embodiments. The disclosure is in no way restricted by the purely schematic drawings, and it should be noted that the drawings are not dimensionally accurate and are not suitable for defining proportions. In the figures.

DETAILED DESCRIPTION

Figure 1:
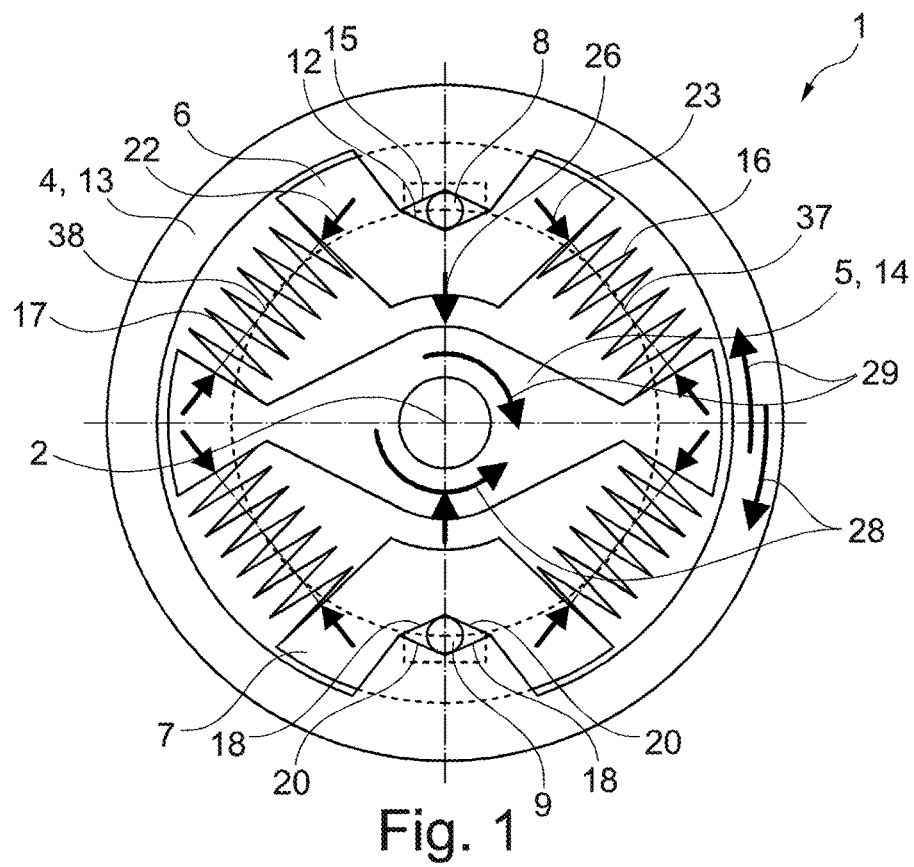
FIG. 1 shows a principle sketch of a torsional vibration damper in a first embodiment.

By way of example, FIG. 1, FIG. 2, FIG. 5, and FIG. 6 each show in a principle sketch different embodiments of a torsional vibration damper 1, which for the sake of clarity are depicted largely in the same manner and insofar as the descriptions of the same components are cross-referenced for the respective figures. Here, an annular disk forms an input side 4, which forms the path side 13 in FIGS. 1 and 5 and forms the force side 14 in FIGS. 2 and 6. In the center of the common rotational axis 2, a further disk element is formed, for example, as the output side 5, which forms the force side 14 in FIG. 1 and FIG. 5 and forms the path side 13 in FIG. 2 and FIG. 6. Alternatively, the annular disk is the output side 5 and the disk element is the input side 4. The variant mentioned above is described below, wherein the terms are interchangeable.

As indicated by the arrows, a traction torque 28 can be transmitted from the input side 4 to the output side 5 and a thrust torque 29 can be transmitted from the output side 5 to the input side 4. In one embodiment, the torque direction is set up in reverse.

Two intermediate elements 6, 7 are provided between the input side 4 and the output side 5. The respective intermediate element 6, 7 of the paired first energy storage element 16 and second energy storage element 17 are connected to the force side 14 in a force-transmitting manner, and thus so as to transmit a torque, and on the path side by means of a transmission path 12. A first or second roll body 8, 9 rolling on the transmission path to the complementary counter path 15 on the path side 13 is supported in a force-transmitting manner and thus so as to transmit a torque. The roll bodies 8, 9 are here pretensioned by means of the energy storage elements 16, 17, against the transmission path 12, and against the counter path 15, and are thus guided in a rotatable manner.

The energy storage elements 16, 17 hold the intermediate elements 6, 7, acting antagonistically to each other in a rest position in the position shown. To the side of the rest position in which the second roll body 9 is shown, a traction torque pairing 18 from the respective complementary ramp portion of the transmission path 12 and the counter path 15 is formed, and a thrust torque pairing 20 on the other side out of the complementary ramp portions of the transmission path 12 and the counter path 15, is also formed. The mechanism of action thereof is explained in detail below. In the embodiments shown, the intermediate elements 6, 7 are supported solely via the energy storage elements 16, 17 and the respective roll bodies 8, 9.

Figure 2:
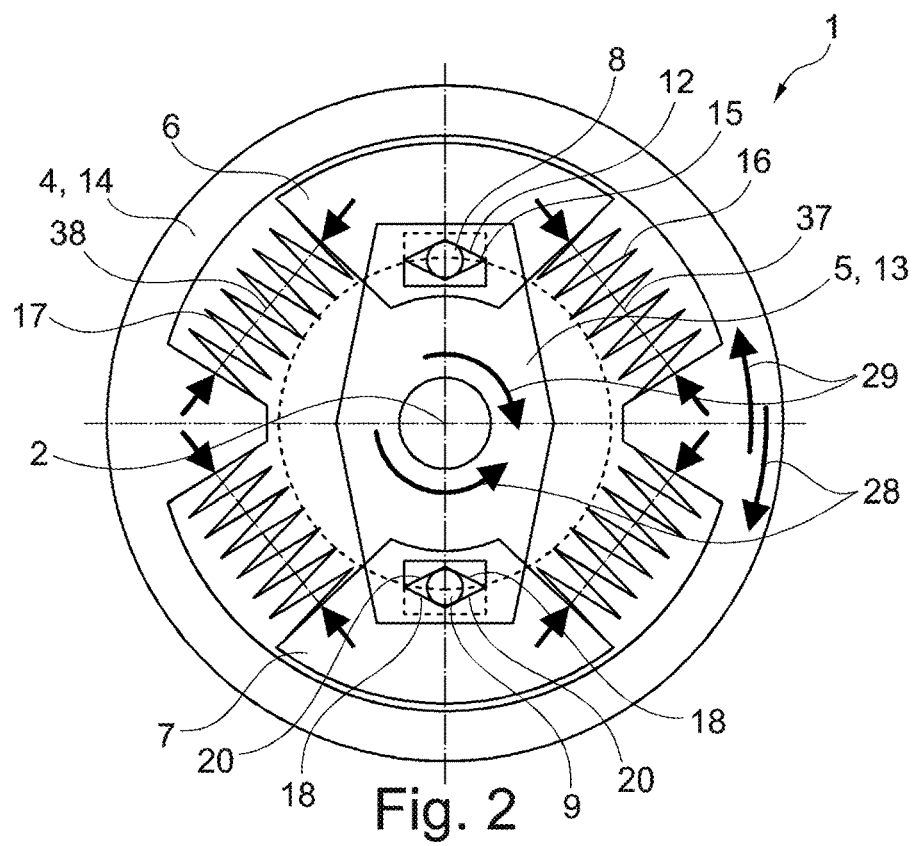
FIG. 2 shows a principle sketch of a torsional vibration damper in a second embodiment.

In FIG. 2, in comparison to FIG. 1, a reverse embodiment is shown with regard to the path side 13 and force side 14, so that the input side 4 here forms the force side 14 and the output side 5 forms the path side 13.

Figure 3:
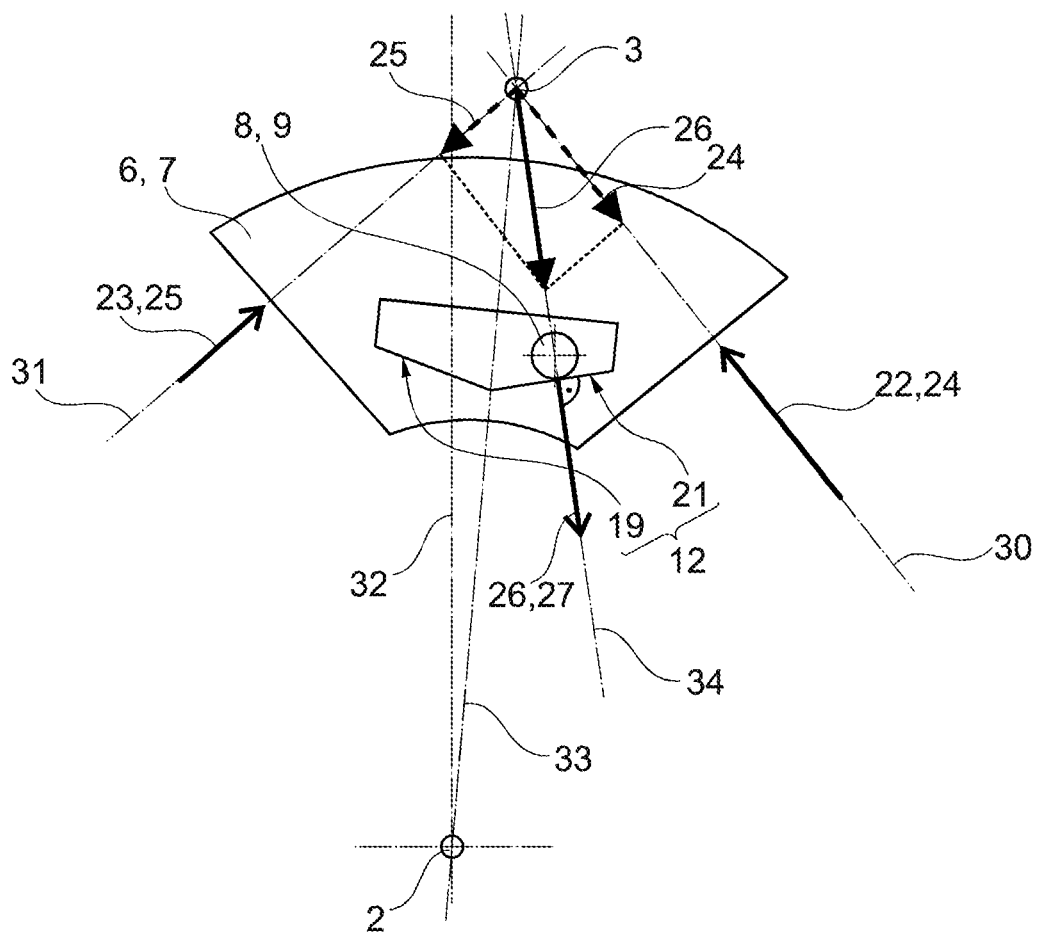
FIG. 3 shows a diagram of the forces applied to an intermediate element.
Figure 4:
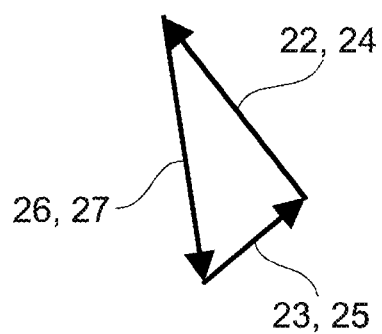
FIG. 4 shows a force triangle of the applied forces according to FIG. 3.

FIG. 3 shows a diagram of the moment equilibrium and FIG. 4 shows a force triangle via the first intermediate element 6, the second intermediate element 7 with a first roll body 8 and the second roll body 9 according to the embodiment in FIG. 1. Here, the intermediate element 6, 7 is led out of the rest position thereof and is deflected at an angle of deflection to the rest position with the center line 33 inclined to the line of rest 32. The line of rest 32, which in the rest position is congruent with the center line 33, always runs through the rotational axis 2 like the center line 33, but only in the rest position through the moment balance point 3 of the intermediate element 6, 7.

The center line 33, which is not to be understood as the geometric or mass-related center, but rather the force-related center of the intermediate element 6, 7, always runs through the moment balance point 3 and the rotational axis 2. At this moment balance point 3 of the intermediate element 6, 7, there must be a moment equilibrium if it is required that no additional guidance for the intermediate element 6, 7 is necessary. The line of rest 32 must always be aligned perpendicular to the adjacent (theoretically infinitesimal) section of the transmission path 12. The line of rest 32 runs through the moment balance point 3 and the rolling axis of the roll bodies 8, 9.

To ensure that this rule is always adhered to, a parallel of the first action line 30 of the first force 22, starting from the first energy storage element 16, with a second parallel, which is at an equal distance or is spaced apart in proportion to the force, of the second action line 31 of the second force 23, intersects the center line 33 and the line of rest 32 in the moment balance point 3, starting from the second energy storage element 17, so that no (active) lever arm arises. Furthermore, it is required that the first force 22, the second force 23, and the resulting force 26 form a self-canceling force triangle, as shown in FIG. 4.

For this purpose, the first direction of force 24, the second direction of force 25 and the resulting direction of force 27 must be present as shown. It follows from the position shown that both the first energy storage element 16 (see FIG. 1) and the second energy storage element 17 (see FIG. 1) are more strongly tensioned, as a result of Which an increased pretensioning force acts on the intermediate element 6, 7. In this embodiment, the stronger tensioning follows from a movement of the intermediate element 6, 7 radially inward, so that the energy storage elements 16, 17 are also moved radially inward and are compressed between the adjacent intermediate elements 6, 7 like a screw clamp. The intermediate elements 6, 7 are thus moved in such a way that the resulting distance along the spring axes 37, 38 of the energy storage elements 16, 17 between the intermediate elements 6, 7 and the force side 14 is shortened compared to the rest position, provided that an increased rigidity at a higher torque is desired (compare FIGS. 5 through 8).

For the correct alignment of the pressure lines 34, i.e., the action lines of the resulting force 26, it is necessary that the pressure line 34, which intersects the rolling axis of the roll body 8, 9 and the moment balance point 3, are always perpendicular to the transmission path 12, here the second transmission curve 21, which is assigned to the thrust torque 29. The respective amount of the resulting force 26 and the resulting direction of force 27 then result intrinsically from the applied first force 22 and second force 23.

Figure 5:
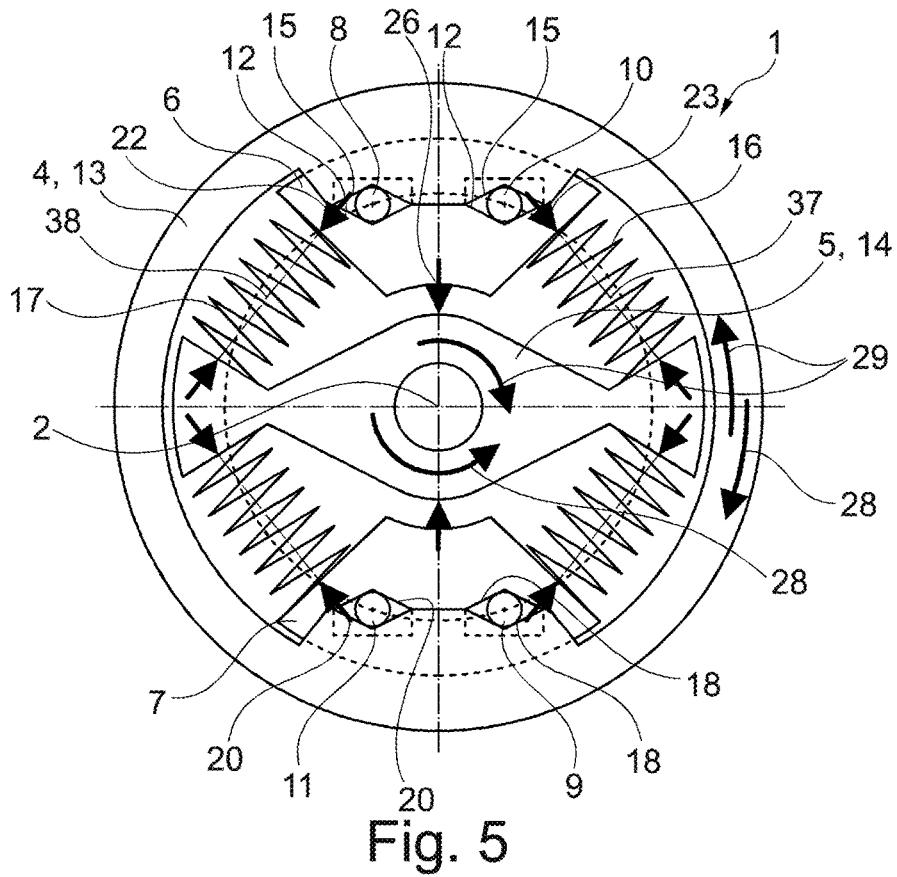
FIG. 5 shows a principle sketch of a torsional vibration damper in a third embodiment.
Figure 6:
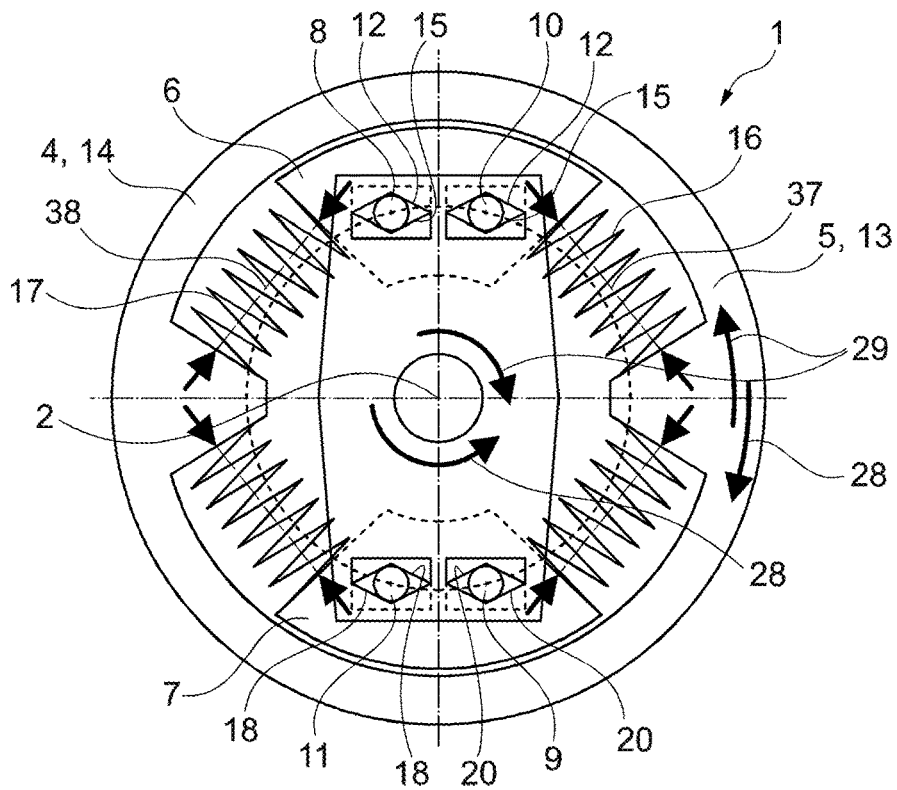
FIG. 6 shows a principle sketch of a torsional vibration damper in a fourth embodiment.

FIGS. 5 and 6 show variants of the embodiments in FIG. 1 and in FIG. 2. Here a constrained guidance is present on the intermediate elements 6, 7, in which in addition to the first roll body 8 and the second roll body 9, also a further, namely a third or a fourth, roll body 10, 11 is provided. In this embodiment, one embodiment deviates from the requirement of a moment equilibrium and an equilibrium of forces over the respective intermediate element 6, 7. All that is required is that a sufficient force (vector) component is generated by the (first) energy storage element 16 (and here also the second energy storage element 17) to hold the roll bodies 8, 9, 10, 11 between the respective transmission path 12 and the complementary counter path 15 or to press the respective intermediate element 6, 7 against the two roll bodies 8, 9, 10, 11. In principle, more roll bodies 8, 9, 10, 11 can also be used. Otherwise, with regard to FIG. 5, reference is made to the description of FIG. 1 or, with regard to FIG. 6, to the description of FIG. 2.

Torque-rotation angle diagrams are shown in FIGS. 7 through 10, in which the torque axis 35 forms the ordinate and the rotation angle axis 36 forms the abscissa. In this example, to the right of the ordinate is a traction torque pathway 28 with a positive dissipated moment and angle of rotation, and to the left of the ordinate is a thrust torque pathway 29 with a negative dissipated moment and angle of rotation.

Figure 7:
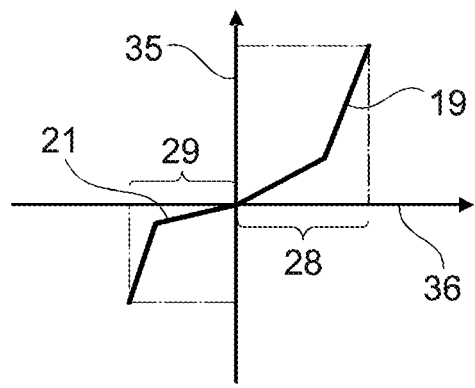
FIG. 7 shows a moment-angle of rotation diagram with a first transmission pathway.

FIG. 7 shows a first transmission curve 19, then associated with the traction torque pairing 18, and a second transmission curve 21, then associated with the thrust torque pairing 20, in a two-part progressive form, so that there is a flat curve slope at low torque amounts, and there is a steep curve slope at high torque amounts.

Figure 8:
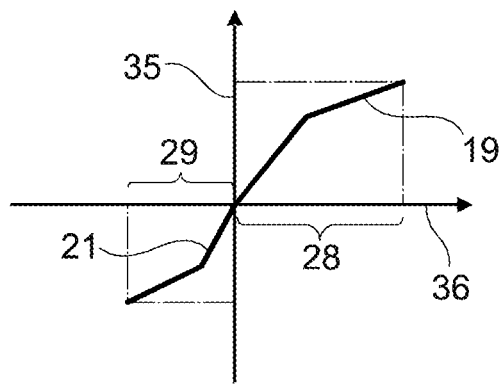
FIG. 8 shows a moment-angle of rotation diagram with a second transmission pathway.

In FIG. 8 is shown a corresponding two-part degressive variant in which there is a steep curve slope at low torque amounts and a flattened curve slope at high torque amounts.

Figure 9:
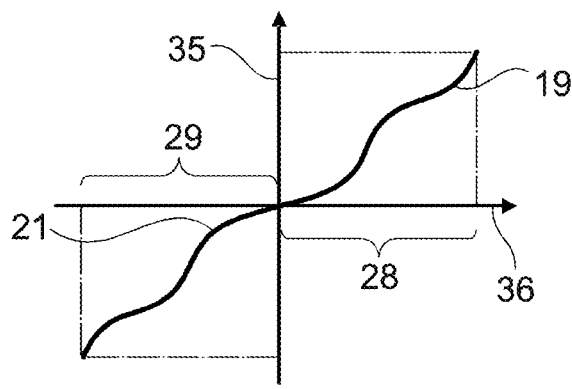
FIG. 9 shows a moment-angle of rotation diagram with a third transmission pathway.
Figure 10:
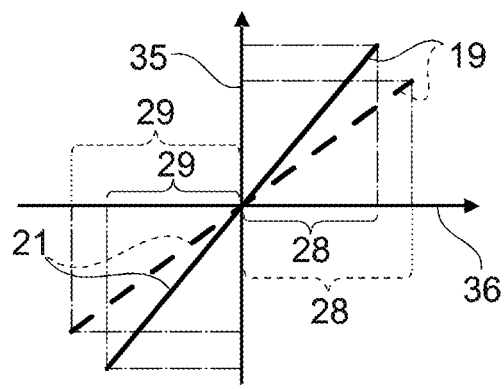
FIG. 10 shows a moment-angle of rotation diagram with a fourth and fifth transmission pathway.

FIG. 9 shows a variant in which a progressive and degressive pathway alternate and FIG. 10 shows a rigid system having a steep curve pathway, shown with a solid line, in comparison with a system having a flat curve course shown with dashed line.

For the embodiment in FIG. 1 and FIG. 2 without additional guidance of the intermediate element 6, 7, such a transmission curve 19, 21 is to be observed in accordance with the moment equilibrium and force equilibrium as explained in FIG. 3 and FIG. 4. The transmission curve 19, 21 shown is therefore designed to be superimposed with the requirement for the transmission path 12 according to the description of FIG. 1 (and FIG. 2). Furthermore, in one embodiment, the (first) force 22 or the rigidity of the first energy storage element 16 is different from the second energy storage element 17 in the rest position and is not designed to be symmetrical as indicated in FIGS. 1 and 2. This must also be taken into account for the superimposition to achieve the desired transmission curve 19, 21.

The torsional vibration damper proposed here enables an inexpensive and efficient influence on the natural frequency to be achieved using few components.

REFERENCE NUMERALS

1 Torsional vibration damper
2 Rotational axis
3 Moment balance point
4 Input side
5 Output side
6 First intermediate element
7 Second intermediate element
8 First roll body
9 Second roll body
10 Third roll body
11 Fourth roll body
12 Transmission path
13 Path side
14 Force side
15 Counter path
16 First energy storage element
17 Second energy storage element
18 Traction torque pairing
19 First transmission curve
20 Thrust torque pairing
21 Second transmission curve
22 First force
23 Second force
24 First direction of force
25 Second direction of force
26 Resulting force
27 Resulting direction of force
28 Traction torque
29 Thrust torque
30 First action line
31 Second action line
32 Rest line
33 Center line
34 Pressure line
35 Torque axis
36 Rotation angle axis 37 First spring axis
38 Second spring axis

The invention claimed is:

1. A torsional vibration damper having a rotational axis for a powertrain of a motor vehicle, comprising:
   an input side for receiving a torque;
   an output side for dispensing the torque;
   an intermediate element arranged for torque transmission between the input side and the output side;
   a first energy storage element and a second energy storage element, the first energy storage element and the second energy storage element supporting the intermediate element such that the intermediate element can vibrate relative to the input side and the output side; and
   a first roll body, wherein:
   the intermediate element comprises a transmission path for the first roll body;
   a one of the input side or the output side comprises a counter path;
   the first roll body is guided in a rotatable manner between the transmission path and the counter path;
   the first energy storage element and the second energy storage element connects the other one of the input side or the output side to the intermediate element for torque transmission;
   the first energy storage element exerts a first force and a first direction of force on the intermediate element;
   the second energy storage element exerts a second force and a second direction of force on the intermediate element; and
     the first force and the second force differ from each other in a rest position; or
     the first direction of force and the second direction of force differ from each other in a rest position.

2. The torsional vibration damper of claim 1, wherein the intermediate element is mounted solely by the first energy storage element, the second energy storage element and the first roll body.

3. The torsional vibration damper of claim 1, further comprising a second roll body, wherein the intermediate element is supported on the one of the input side or the output side by the first roll body and the second roll body.

4. The torsional vibration damper of claim 1, wherein the intermediate element is supported on the one of the input side or the output side by the first roll body.

5. The torsional vibration damper of claim 1, wherein:
   the transmission path and the counter path comprise:
     a traction torque pairing with a first transmission curve; and
     a thrust torque pairing with a second transmission curve;
   the traction torque pairing is arranged for torque transmission from the input side to the output side;
   the thrust torque pairing is arranged for torque transmission from the output side to the input side; and
   a first transmission pathway of the first transmission curve differs from a second transmission pathway of the second transmission curve, at least in sections.

6. The torsional vibration damper of claim 1, wherein the first energy storage element is a helical compression spring with a straight spring axis.

7. The torsional vibration damper of claim 6, wherein the first energy storage element is displaceably mounted on the intermediate element or on the other one of the input side or the output side transversely to the straight spring axis.

* * * * *